Patented Jan. 16, 1951

2,538,729

UNITED STATES PATENT OFFICE 2,538,729

COMPOSITION FOR CONTROL OF MITE AND INSECT PESTS

Eugene E. Kenaga, Midland, Mich., assignor to The Dow Chemical Company, Midland, Mich., a corporation of Delaware No Drawing. Application August 4, 1949, Serial No. 108,654

4 Claims. (Cl. 167—30)

This invention relates to parasiticides and is particularly concerned with a composition including as active toxicants the 4-chlorophenyl ester of 4-chlorobenzene sulfonic acid and the gamma-isomer of benzene hexachloride.

Benzene hexachloride (hexachlorocyclohexane) is a known chemical compound, and methods for its preparation and the separation of the alpha, beta, gamma, and delta isomeric forms of the compound have been described by Van der Linden (1912 Berichte 45, 231–47) and others. Since that time, new methods for the production of benzene hexachloride have been developed, and the gamma-isomer of the compound and isomeric mixtures containing the gamma-isomer have come to be recognized as organic parasiticidal toxicants of great promise.

While the mixed isomeric benzene hexachloride product has parasiticidal properties, it has been found that the gamma-isomer is much more effective than the alpha-, beta-, and delta-isomers. This preferred gamma-isomer is a white crystalline material melting at about 112.5° C. It is substantially insoluble in water and somewhat soluble in most organic solvents including methanol, benzene, xylene, toluene, carbon tetrachloride, chloroform and ethylene chloride.

According to the present invention, the 4-chlorophenyl ester of 4-chlorobenzene sulfonic acid is mixed with the gamma-isomer of benzene hexachloride to obtain improved toxicant compositions having very desirable properties for the control of plant parasites. In such compositions, the toxicants are mutually activating so that a greater than additive or synergistic result is obtained, particularly as regards the control of mite and spider mite organisms. The mixture of toxicants permits the utilization of reduced amounts of the gamma-isomer of benzene hexachloride and 4'-chlorophenyl 4-chlorobenzene sulfonate, and the achievement of results superior to those obtainable when either of the constituents is used separately. A further advantage resides in the prolonged residual effect exerted by the mixture. Thus a single application of the mixture, compounded with a suitable carrier, gives excellent control of *Tetranychus bimaculatus* (two-spotted spider mite), *Paratetranychus pilosus* (European red mite), and *Bryobia praetiosa* (clover mite) for periods ranging up to several months. Also, spray and dust compositions comprising the combination of toxicants, in the amounts required to accomplish the desired control, do not appear to cause injury to either the foliage or the fruit of treated plants.

In operating in accordance with the present invention, any suitable amount of the gamma-isomer of benzene hexachloride may be employed in combination with 4'-chlorophenyl 4-chlorobenzene sulfonate to obtain compositions in which the toxicants are mutually activating. The exact amounts of the toxicants in the mixture do not appear to be critical. The preferred proportions are dependent upon the type of composition in which the mixture of toxicants is applied, the organism concerned and the period for which the residual action and control is desired. Ordinarily, from about 0.1 to 20 parts by weight of the gamma-isomer of benzene hexachloride is employed with each 10 parts of 4'-chlorophenyl 4-chlorobenzene sulfonate. In spray compositions, the proportions of the toxicants and dosages applied should be so integrated that the content of the gamma-isomer of benzene hexachloride is at least 0.01 pound and the content of 4'-chlorophenyl 4-chlorobenzene sulfonate is at least 0.1 pound per 100 gallons. The exact dosages employed are determined by the organism to be controlled and the tolerance of the host plant for the toxicant mixture. In dusts, good results are obtained with compositions containing from 1 to 10 per cent by weight of the mixture of toxicants. With either sprays or dusts, a uniform and thorough coverage of all plant surfaces is desirable. In concentrates, the mixture of toxicants may constitute from about 5 to 95 per cent by weight of the ultimate composition.

It is to be understood that either toxic component may be employed in excess of the indicated preferred proportion. In such a composition the excess of either parasiticide toxicant in no way detracts from the improved results obtainable with the basic synergistic mixture.

The new toxicant mixtures may be employed with an inert material as a carrier, e. g. water, a finely divided solid, a solvent liquid of organic origin, a wetting and dispersing agent, and any suitable combination of any of these. In such formulations the mixture of toxicants may be present (1) in relatively high proportion to provide a concentrate adapted for further dilution to produce spray or dust compositions, or (2) in low proportion to provide compositions suitable for application without further modification.

In the preparation of sprays, the gamma-isomer of the benzene hexachloride and 4'-chlorophenyl 4-chlorobenzene sulfonate may be separately dispersed in the water or other liquid carrier. Alternatively, the toxicants may be mixed one with the other and the resulting mixture dispersed in the carrier. A further mode of operation includes grinding the toxicants with bentonite, diatomaceous earth, or talc, and dispersing the resulting mixture in water. Any compatible wetting or dispersing agent may be employed in the spray compositions.

In the preparation of dusts, the mixture of toxicants may be ground with the finely divided solid in any suitable manner. Operable carriers include clays, volcanic ash, diatomaceous earth, talc, wood flours, pyrophyllite and the like.

Where a concentrate is desired, the gamma-isomer of benzene hexachloride and 4'-chlorophenyl 4-chlorobenzene sulfonate may be ground or otherwise dispersed with wetting and dispersing agents to obtain products adapted to be dispersed in water or other aqueous spray composition. Alternatively, the toxicants may be separately compounded in concentrate form and mixed together upon dilution in the spray tank or otherwise.

The toxicants also may be dissolved in a water miscible liquid to produce a concentrate adapted subsequently to be incorporated into aqueous spray mixtures. A further type of concentrate consists of a dispersion of the toxicant mixture in a finely divided solid carrier, with or without emulsifying or dispersing agents. In such mixture a high percentage of the toxicant mixture is employed, and the product may be subsequently dispersed in water to produce aqueous spray mixtures or further diluted with finely divided carrier to produce dusts.

4'-chlorophenyl 4-chlorobenzene sulfonate is a white crystalline solid melting at 81°–83° C., and having the following formula:

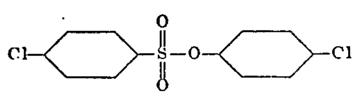

The following examples illustrate the invention but are not to be considered as limiting:

*Example 1*

A parasiticide concentrate composition was prepared in the form of a wettable powder by grinding and mixing 25 parts by weight of benzene hexachloride (99 per cent gamma isomer), 72 parts of fuller's earth, 2 parts of the compounded substituted benzoic alkyl sulfonic acids (Daxad No. 27), and 1 part of an alkyl aryl sulfonate (Nacconol NR). This product is referred to hereinafter as "concentrate A." Similarly, 50 parts by weight of 4'-chlorophenyl 4-chlorobenzene sulfonate, 47 parts of fuller's earth, 2 parts of Daxad, and 1 part of Nacconol NR were ground and mixed together to produce a composition hereinafter referred to as "concentrate B."

The respective concentrates were dispersed in water to prepare spray compositions having the following concentrations of toxicants per 100 gallons:

No. 1. 1/32 pound of the gamma-isomer of benzene hexachloride.

No. 2. 2 pounds of 4'-chlorophenyl 4-chlorobenzene sulfonate.

No. 3. 1/32 pound of the gamma-isomer of benzene hexachloride and 2 pounds of 4'-chlorophenyl 4-chlorobenzene sulfonate.

No. 4. 1/64 pound of the gamma-isomer of benzene hexachloride and 1 pound of 4'-chlorophenyl 4-chlorobenzene sulfonate.

These four compositions were employed for the control of southern army worm on mature cranberry bean plants. In such operations, the indicated compositions were applied to the bean plant foliage, the leaf surfaces allowed to dry, and the plants then infested with a known number of insect larvae. Three days after infestation, the plants were examined to ascertain the control of southern army worms that had been obtained, and the following situation, expressed in per cent kill, was found to exist:

| Composition: | Per cent kill |
|---|---|
| No. 1 | 70 |
| No. 2 | 0 |
| No. 3 | 100 |
| No. 4 | 100 |

*Example 2*

A similar set of spray compositions was prepared from concentrates A and B by dispersing them in water in the following concentrations per 100 gallons:

No. 1. 1/8 pound of the gamma-isomer of benzene hexachloride.

No. 2. 1/4 pound of 4'-chlorophenyl 4-chlorobenzene sulfonate.

No. 3. 1/8 pound of the gamma-isomer of benzene hexachloride and 1/4 pound of 4'-chlorophenyl 4-chlorobenzene sulfonate.

No. 4. 1/16 pound of the gamma-isomer of benzene hexachloride and 1/8 pound of 4'-chlorophenyl 4-chlorobenzene sulfonate.

These spray compositions were employed for the control of Mexican bean beetle larvae on mature cranberry bean plants. The application and infestation techniques followed in these operations were identical with those described in Example 1. Three days after the infestation, the following percentage kills were observed:

| Composition: | Per cent kill |
|---|---|
| No. 1 | 55 |
| No. 2 | 20 |
| No. 3 | 90 |
| No. 4 | 55 |

*Example 3*

Aqueous spray compositions having the following toxicant concentrations were prepared as previously described from concentrates A and B No. 1. 3 pounds of the gamma-isomer of benzene hexachloride.

No. 2. 2 pounds of 4'-chlorophenyl 4-chlorobenzene sulfonate.

No. 3. 3 pounds of the gamma-isomer of benzene hexachloride and 2 pounds of 4'-chlorophenyl 4-chlorobenzene sulfonate.

No. 4. 1½ pounds of the gamma-isomer of benzene hexachloride and 1 pound of 4'-chlorophenyl 4-chlorobenzene sulfonate.

The spray compositions were applied to groups of mature cranberry bean plants infested with two-spotted spider mite adults. Three days after the application, the plants were examined and the following percentage kills observed:

| Composition: | Per cent kill |
|---|---|
| No. 1 | 57 |
| No. 2 | 16 |
| No. 3 | 100 |
| No. 4 | 97 |

*Example 4*

4'-chlorophenyl 4-chlorobenzene sulfonate and sodium lauryl sulphate were mixed in a ball mill to prepare a concentrate composition containing 32.5 per cent by weight of toxicant. This composition and concentrate A were dispersed in water to prepare spray compositions having the following toxicant concentrations per 100 gallons:

No. 1. 0.12 pound of 4'-chlorophenyl 4-chlorobenzene sulfonate.

No. 2. 1.0 pound of the gamma-isomer of benzene hexachloride.

No. 3. 0.12 pound of 4'-chlorophenyl 4-chlorobenzene sulfonate and 1.0 pound of the gamma-isomer of benzene hexachloride.

These spray compositions were employed for the control of two-spotted spider mite eggs and adults on mature cranberry bean plants. In such operations, the bean plants were infested with a known number of two-spotted spider mite adults 96 hours following the application of the spray compositions. 48 hours after infestation, the plants were examined to ascertain the control of adult mites together with the control of mite eggs which had been oviposited upon the plant surfaces. The following situation expressed in per cent kill was found to exist:

| Composition | Per cent control | |
| --- | --- | --- |
| | Adults | Eggs |
| No. 1 | 0 | 14 |
| No. 2 | 0 | 6 |
| No. 3 | 27 | 85 |

*Example 5*

An aqueous spray composition containing 12 pounds of concentrate A and 3 pounds of concentrate B is applied as a summer spray in an orchard of bearing Jonathan apple trees heavily infested with European red mite and two-spotted spider mite. The application is made with conventional spray rig at a temperature of from 75°–80° F., and in such amount as to provide for appreciable run-off from the treated leaf and woody surfaces. Unsprayed check plots are maintained through the orchard to provide a continuous source of reinfestation. As a result of this treatment, a commercial control of mite organisms is obtained and persists over the balance of the growing season. No significant foliage injury results from the application of the mixture of toxicants. The trees treated therewith remain lush and green throughout the growing season, and are not subject to the leaf and fruit drop from mite attack which characterizes the trees in the check plots.

I claim:

1. A composition for the control of mite and insect pests comprising as active toxic ingredients (1) the 4-chlorophenyl ester of 4-chlorobenzene sulfonic acid and (2) the gamma-isomer of benzene hexachloride, the active toxic ingredients in such composition being mutually activating.

2. A composition for the control of mite and insect pests comprising as active toxic ingredients from 0.1 to 20 parts by weight of the gamma-isomer of benzene hexachloride for each 10 parts of the 4-chlorophenyl ester of 4-chlorobenzene sulfonic acid, the active toxic ingredients in such composition being mutually activating.

3. A composition for the control of mite and insect pests comprising a carrier and dispersed therein as active toxic ingredients from 0.1 to 20 parts by weight of the gamma-isomer of benzene hexachloride for each 10 parts of the 4-chlorophenyl ester of 4-chlorobenzene sulfonic acid, the active toxic ingredients in such composition being mutually activating.

4. A composition for the control of mite and insect pests comprising an aqueous carrier and dispersed therein as active toxic ingredients from 0.1 to 20 parts by weight of the gamma-isomer of benzene hexachloride for each 10 parts of the 4-chlorophenyl ester of 4-chlorobenzene sulfonic acid, the active toxic ingredients of such composition being mutually activating and being present in the amount of at least 0.01 pound of the gamma-isomer of benzene hexachloride and 0.1 pound of the 4-chlorophenyl ester of 4-chlorobenzene sulfonic acid per 100 gallons of spray.

EUGENE E. KENAGA.

REFERENCES CITED

The following references are of record in the file of this patent:

UNITED STATES PATENTS

| Number | Name | Date |
| --- | --- | --- |
| 2,148,928 | Meuron | Feb. 28, 1939 |

OTHER REFERENCES

Metcalf, "Acaricidal Properties of Organic Compounds Related to DDT," J. Econ. Ent., vol. 41, No. 6, December 1948.

Lauger, "Uber Konstitution und Toxische Wirkung . . .," Helvetica Chimica Acta, vol. 27, June 15, 1944, pages 892–922.

Taylor, "Benzenehexachloride. A Promising New Acaricide," The Veterinary Record, vol. 57, No. 18, May 5, 1945, pages 210–211.